R. J. Robeson.
Revolving Rake.
N° 48629.    Patented Jul. 4, 1865.

Witnesses
Geo. W. Springer
H. W. Burdick

Inventor:
Robert J. Robeson
by
Coburn & Marrs
Attorney

UNITED STATES PATENT OFFICE.

ROBERT I. ROBESON, OF CHICAGO, ILLINOIS, ASSIGNOR TO HIMSELF AND JARED W. MILLS, OF SAME PLACE.

IMPROVEMENT IN HORSE-RAKES.

Specification forming part of Letters Patent No. 48,629, dated July 4, 1865.

*To all whom it may concern:*

Be it known that I, ROBERT I. ROBESON, of the city of Chicago, in the county of Cook and State of Illinois, have invented a new and useful Improvement in Revolving Sulky-Rakes; and I do hereby declare that the following is a full, clear, and exact description of the same, reference being had to the accompanying drawings and the letters and figures marked thereon, which form part of this specification.

My said invention consists in so attaching and combining a revolving rake with a wheeled support or sulky that the operator may ride upon the same, and at the same time by a suitable and novel arrangement can control and operate the rake with the utmost ease and accuracy.

To enable those skilled in the art to understand how to construct and use my invention, I will now proceed to describe the same with particularity, making reference in so doing to the aforesaid drawings, in which—

Figure 1:
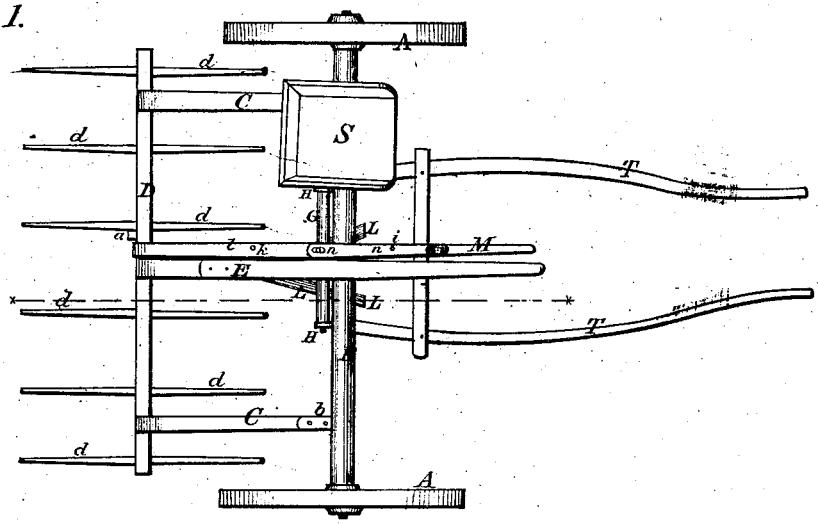
Figure 2:
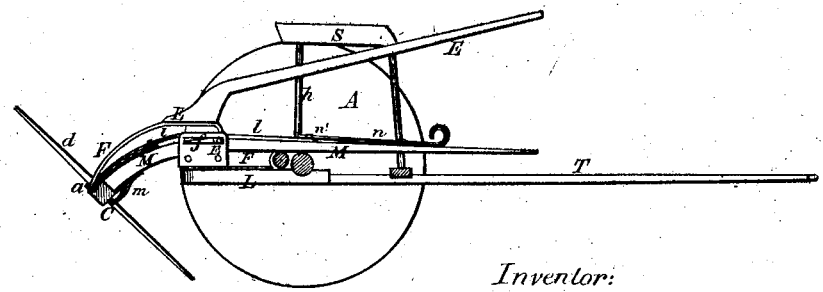

Figure 1 is a plan or top view of my invention; Fig. 2, a side view thereof in section at the line $x$ in Fig. 1.

Similar letters of reference in the different figures denote the same parts of my invention.

A A represent the wheels, and B the axle, of the machine, the revolving rake D $d$ being attached to the axle by the curved arms C C, which are hinged to the axle at $b$, so as to allow of a vertical motion about the point $b$, and which are provided with suitable bearings at the opposite ends, in which the rake-head D revolves.

E represents a lever, one end of which is attached to the middle point of the rake-head D by inclosing said rake-head in a suitable bearing, so as to allow it to revolve therein, said lever extending forward, so as to be readily operated by the driver upon the seat, (marked S,) and having its fulcrum at $e$, as shown in Fig. 2.

$e$ represents a short rod or pin passing transversely through that part of E which projects downward at that point, the ends of said rod $e$ projecting laterally through the slots $f$, as shown in Fig. 2. The said slots $f$ are constructed, as shown, in a metallic attachment to the hinged arm F, which is attached to the short shaft G supported in the bearings H, so as to allow said arm F to have a vertical motion about the point of its attachment to G, for the purposes hereinafter described. Instead of the method herein shown, the said arm F may be hinged at its front end in any suitable manner which will permit a free vertical motion to the rear end of said arm, as aforesaid.

L represents a frame fixed rigidly to the axle B, to support said arm F and prevent its falling down below said position shown.

When the rake lies flat, or nearly so, upon the ground, as when in operation, the fulcrum $e$ lies at the rear end of the slot $f$; but when the front end of the lever E is brought down to the positions shown to throw the rake into the position seen in Fig. 2, so as to revolve the same, the fulcrum $e$ slides forward to the front end of said slot, as shown. When the rake is thrown upon the point of the teeth, as shown, the rake revolves, and the rake-head D is thrown up, which movement renders the hinged arm F necessary, which thus admits of such upward movement of the rake. To the said rake-head there is also attached the arm M, the rake-head passing through a suitable bearing in the ends thereof. To the under side of the said arm M is fixed the finger $m$, which rests upon the stop $c$ upon the rake-head, so that by bearing down upon said arm M the front end of the rake-teeth are pressed and held down closely upon the ground, and thus enable the operator to rake the ground clean and avoid all loss of hay or other crops which may be raked. Upon the top of said arm M there is arranged a jointed lever, (marked $l\ n$,) jointed at $n'$ and fulcrumed at $i\ k$, as shown in Fig. 1, so that by moving the front end of the lever $n$ toward the operator the rear end of the lever $l$ is thrown upon the stop $a$ upon the rake-head, so that by raising the front end of M the front end of the rake-teeth are thrown up so as to allow the rake to slide over any obstruction which may lie in the way. When the obstruction is past the lever may be thrown off from said stop $a$, so as to allow the rake to revolve, as before mentioned.

Having described my invention, I will now specify what I claim and desire to secure by Letters Patent:

1. The employment of the hinged or adjustable fulcrum F, provided with the slot $f$, arranged and operating substantially as and for the purposes herein specified and shown.

2. The combination of the lever E, provided with the rod or rest $e$, and the hinged arm or fulcrum F, provided with the slot $f$, as and for the purposes specified.

3. The combination of the rake D, the levers E and arm M, the lever $l\ n$, and hinged fulcrum F, all arranged and operating substantially as and for the purposes specified and shown.

ROBERT I. ROBESON.

Witnesses:
J. A. HOISINGTON,
ANTHONY OTTO.